(12) United States Patent
Boulter et al.

(10) Patent No.: US 7,377,407 B2
(45) Date of Patent: May 27, 2008

(54) MODULAR WATER VENDING SYSTEM AND DISPENSER

(75) Inventors: Roger P. Boulter, La Feria, TX (US); Robert E. Renick, Jr., Huntington Beach, CA (US)

(73) Assignee: Entrepure Industries, Inc., Harlingen, TX (US)

( * ) Notice: Subject to any disclaimer, the term of this patent is extended or adjusted under 35 U.S.C. 154(b) by 231 days.

(21) Appl. No.: 11/109,308

(22) Filed: Apr. 19, 2005

(65) Prior Publication Data

US 2006/0237557 A1    Oct. 26, 2006

(51) Int. Cl.
  *B67D 5/08*    (2006.01)
(52) U.S. Cl. .............. 222/320; 222/190; 222/537; 141/284; 141/369
(58) Field of Classification Search ............. 222/190, 222/320, 537; 141/89–91, 97, 284, 369, 141/374
See application file for complete search history.

(56) References Cited

U.S. PATENT DOCUMENTS

| 528,946 | A | 11/1894 | Knittel |
|---|---|---|---|
| 2,063,171 | A | 12/1936 | Kucher |
| 2,957,607 | A | 10/1960 | Smith |
| 3,127,756 | A | 4/1964 | Field |
| 3,221,859 | A | 12/1965 | McAbee |
| 3,375,913 | A | 4/1968 | Norris, Jr. |
| 3,493,416 | A | 2/1970 | Hansen et al. |
| 3,493,496 | A | 2/1970 | Bray et al. |
| 3,630,378 | A | 12/1971 | Bauman |
| 3,856,676 | A | 12/1974 | Grimme, Jr. et al. |
| 3,913,343 | A | 10/1975 | Rowland et al. |
| 4,160,727 | A | 7/1979 | Harris |
| 4,176,063 | A | 11/1979 | Tyler |
| 4,226,267 | A | 10/1980 | Meacham |
| 4,235,352 | A | 11/1980 | Newman et al. |
| 4,319,613 | A | * 3/1982 | Mette ................. 141/39 |
| 4,456,149 | A | 6/1984 | Sciortino |
| 4,501,381 | A | 2/1985 | Hart |
| 4,623,467 | A | 11/1986 | Hamlin |
| 4,732,301 | A | 3/1988 | Tobias et al. |
| 4,753,081 | A | 6/1988 | Koeneman et al. |
| 4,788,830 | A | 12/1988 | Schreiner et al. |
| 4,801,375 | A | 1/1989 | Paoilla |

(Continued)

OTHER PUBLICATIONS

Hoshizaki America, Inc., 618 Highway 74 S., Peachtree City, GA 30269 Crescent Ice Cuber marketing material, Jun. 1994, KMI600S Series, Item #13041.

(Continued)

*Primary Examiner*—J. Casimer Jacyna
(74) *Attorney, Agent, or Firm*—Rick Martin; Patent Law Offices of Rick Martin, PC

(57) ABSTRACT

A purified water filtration, storage and vend system has a distributed housing design with a main unit having a filtration module, a storage tank, and a vend station. A slave unit has a storage tank and a vend station. A retractable nozzle assembly feeds each vend station purified water. The nozzle is mounted in a housing with an ozone chamber at its base. A sled in the housing is powered by a single actuator. When the actuator arm moves down, it moves a linkage to open a shutter at the base of the housing and simultaneously extends the nozzle through the open shutter.

18 Claims, 11 Drawing Sheets

U.S. PATENT DOCUMENTS

| | | | |
|---|---|---|---|
| 4,803,847 A | 2/1989 | Koeneman et al. |
| 4,808,302 A | 2/1989 | Beall, Jr. |
| 4,859,320 A | 8/1989 | Beall, Jr. |
| 4,881,661 A | 11/1989 | Jones |
| 4,885,085 A | 12/1989 | Beall, Jr. |
| 4,897,099 A | 1/1990 | Ruff |
| 4,911,212 A | 3/1990 | Burton |
| 4,923,091 A | 5/1990 | Sutera |
| 4,941,902 A | 7/1990 | Ruff |
| 4,969,991 A | 11/1990 | Valadez |
| 4,997,553 A | 3/1991 | Clack |
| D323,355 S | 1/1992 | Dolifka |
| 5,083,442 A | 1/1992 | Vlock |
| 5,112,477 A | 5/1992 | Hamlin |
| 5,114,042 A | 5/1992 | Sutera |
| 5,135,645 A | 8/1992 | Sklenak et al. |
| D341,627 S | 11/1993 | Dolifka |
| 5,297,401 A | 3/1994 | Hawco |
| 5,299,604 A | 4/1994 | Pierce |
| 5,368,197 A | 11/1994 | Sutera |
| 5,373,874 A | 12/1994 | Shieh |
| 5,405,052 A | 4/1995 | Sawyer, III |
| 5,409,094 A | 4/1995 | Muraco |
| 5,443,739 A | 8/1995 | Vogel et al. |
| 5,484,538 A | 1/1996 | Woodward |
| 5,507,329 A | 4/1996 | Shub |
| 5,511,388 A | 4/1996 | Taylor et al. |
| 5,582,717 A | 12/1996 | Di Santo |
| 5,722,244 A | 3/1998 | Shelton |
| 5,782,380 A | 7/1998 | DiSanto |
| 5,862,840 A * | 1/1999 | Hansen | 141/90 |
| 5,881,913 A | 3/1999 | Boulter | 222/2 |
| 5,910,164 A | 6/1999 | Snelling et al. |
| 5,911,884 A | 6/1999 | Boulter |
| 6,093,312 A | 7/2000 | Boulter |

OTHER PUBLICATIONS

Hoshizaki America, Inc., 618 Highway 74 S., Peachtree City, GA 30269 Sanitary Cube Dispenser marketing material, Aug. 1994, DB 200 Series, Item #13022.

Ice-O-Matic/Mile High, 11100 E. 45th Ave., Denver, CO 80239 Cube Ice Dispenser marketing material, Apr. 1996, CD Series 200, 300, 400, 600 or 500.

Kloppenberg & Co., 2627 West Oxford, Englewood, CO 80110 Ice Dispenser/Bagger marketing material, Model Nos. DISP-500-S, DISP-1000-S, DISP-1200-S, DISP-2200-S.

* cited by examiner

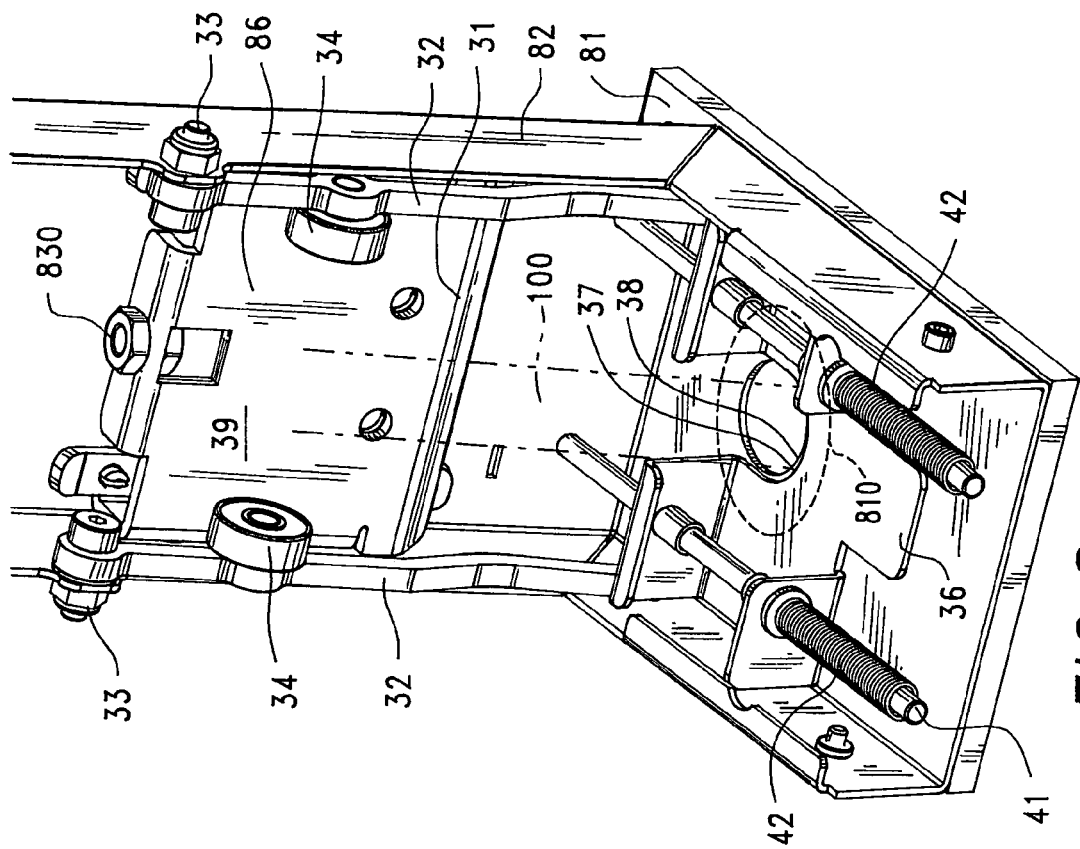
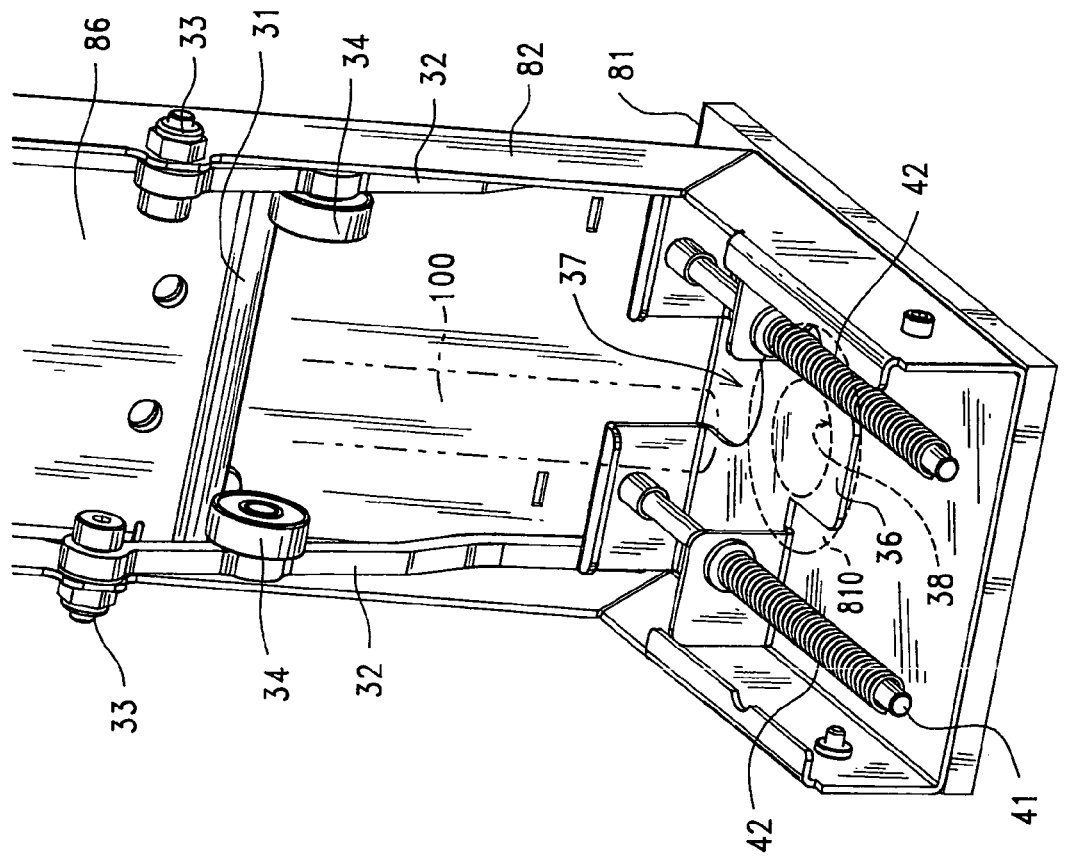
FIG. 8
FIG. 7

MODULAR WATER VENDING SYSTEM AND DISPENSER

FIELD OF INVENTION

The present invention relates to the modular housing of multiple water vending stations which may share a water storage module, wherein each vend station has an improved, sanitizing dispensing nozzle.

BACKGROUND OF THE INVENTION

U.S. Pat. No. 5,911,884 (1999) to Boulter discloses an RO water purification system, as well as a sanitizing dispensing nozzle. A kiosk is large enough to house an entire RO filtration system, a storage tank, and several vend stations around its periphery. No sharing of filtration or storage components among several kiosks is disclosed or suggested. Each nozzle has an ozone gas sterilizer and a retraction assembly.

U.S. Pat. No. 6,093,312 to Boulter discloses an RO filtration system and an ice dispenser.

U.S. Pat. No. 5,881,913 (1999) to Boulter discloses a sanitizing, dispensing nozzle. The nozzle is controlled by a controller so as to retract into a shutter assembly when not vending water. Ozone is used for sanitizing the nozzle.

Problems with the above-noted prior art include the large floor space requirements of a kiosk, indeed, almost a twenty foot square is needed to house a kiosk. The retractable nozzle assembly ('913 FIGS. 12, 13) has a hole 152 which can be tampered with, for example, by putting bubble gum into hole 152, even when the nozzle is retracted. The ozone also fills the entire enclosure 120, thereby causing rubber and plastic parts therein to deteriorate, which increases maintenance costs. Also, two actuators are needed, one for the nozzle retractor and one for the door opener.

The present invention addresses these shortcomings. A modular housing module of about 6 feet in width and three feet in depth can be placed against a wall. Various modules can share the filtration and water storage components, thereby dispersing the RO and storage components throughout a retail area. Pipes can connect various modules all around a mall and/or parking area. Water vend units can be discretely placed against walls throughout a retail area to maximize floor space usage.

The present invention nozzles retract into an enclosure with tamper-resistant doors, whereby no opening is exposed to the public when the nozzle is retracted. An ozone enclosure assembly keeps most of the ozone adjacent the nozzle thereby minimizing the deterioration of other flexible parts. A single actuator opens a shutter and extends the nozzle via a linkage.

SUMMARY OF THE INVENTION

An aspect of the present invention is to provide a tamper-resistant nozzle assembly for a fluid vend machine.

Another aspect of the present invention is to provide an ozone sanitizer for the nozzle which contains most of the ozone around the nozzle.

Another aspect of the present invention is to provide a single actuator to extend the nozzle while coordinating the opening of a shutter door.

Another aspect of the present invention is to provide a water vend system in a modular housing so as to disperse filtration and storage components among various housing modules to minimize the footprint of each housing module, wherein each housing module contains a water vend assembly.

Another aspect of the present invention is to provide each housing module with a flush-to-a-wall mounting capability, wherein a front panel entrance means functions to allow maintenance access from the front without moving the housing.

Other aspects of this invention will appear from the following description and appended claims, reference being made to the accompanying drawings forming a part of this specification wherein like reference characters designate corresponding parts in the several views.

OTHER ASPECTS

The distributed water vend housing system uses similar outside housing modules. Each module has at least one vend station, wherein the back of the module can be placed against a wall, or back to back with another module. City water is piped to a primary module which houses the filtration components, preferably an RO system, as well as a storage tank. A secondary module houses a storage tank. It is generally placed in close contact with the primary module. All modules contain at least one vend station. The primary and secondary module storage tanks are daisy chained together, so that each tank reaches the same level of water. This is done in a static mode, without the use of pumps. Pumps could be used in an alternate embodiment.

Each vend station has at least one retractable nozzle assembly, each with a single actuator that retracts the water nozzle behind sliding doors after a vend cycle. Ozone is contained in a sanitizing enclosure to keep the ozone primarily around the nozzle.

BRIEF DESCRIPTION OF THE DRAWINGS

FIG. 7 is a rear perspective view of the shutter assembly closed.

FIG. 8 is a rear perspective view of the shutter assembly opened.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
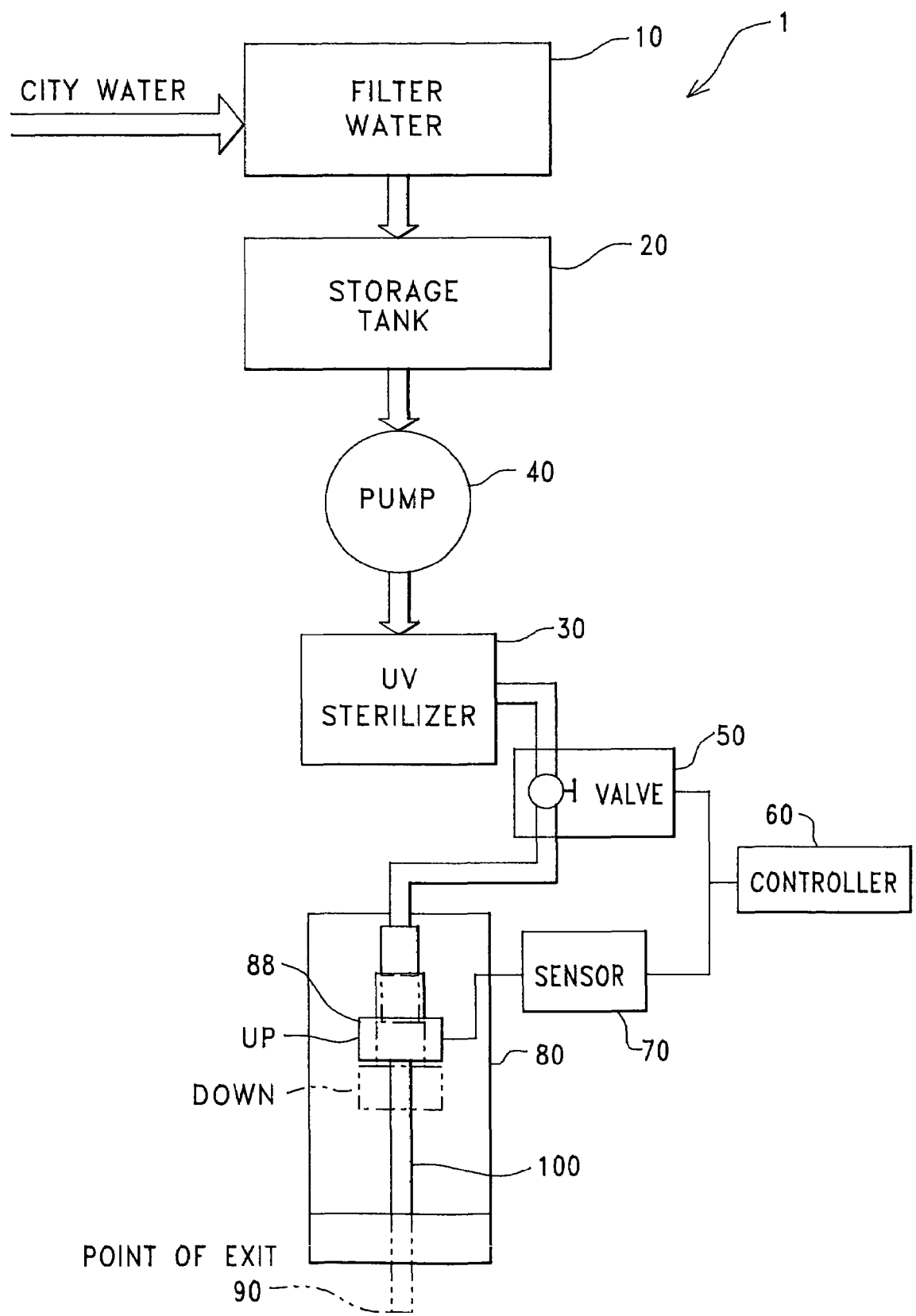
FIG. 1 is a schematic diagram of the overall filtered water vending system.

Referring first to FIG. 1, the overall water vend system 1 is depicted schematically. A multi-stage filter 10 accepts approved city water and sends the filtered water to a storage tank 20. On demand, a controller 60 sends a signal to the nozzle assembly 80 causing it to extend into the vend position. When the sensor 70 confirms the nozzle 100 is extended as shown in dots, the controller 60 sends a signal to the vend valve 50 and opens the valve allowing water to flow through the nozzle assembly 80, through the nozzle 100 to the point of exit 90. The pump 40 is preset to a pressure point and maintains residual pressure to start the flow of water. Pump 40 also contains a pressure sensor, integral to the pump, which upon sensing the residual pressure drop from the initial flow of water, turns the pump on, allowing water from the storage tank 20 to be pumped under pressure through pump 40, through the UV sterilizer 30, through the opened vend valve 50, through the nozzle assembly 80, through the nozzle 100 to the point of exit 90 until the vend cycle is complete. A check valve 88 prevents contamination of the filtered water.

Figure 2:
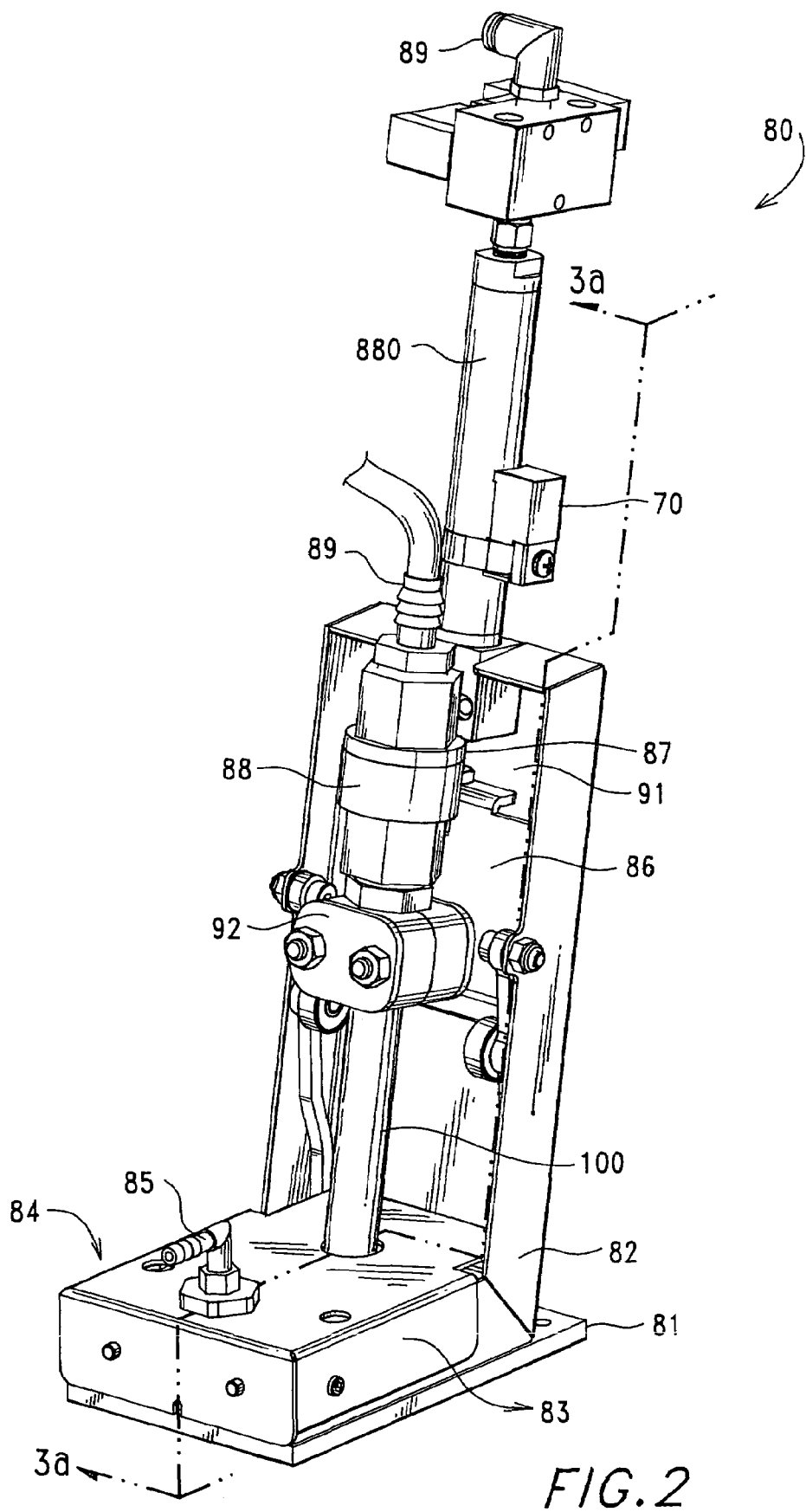
FIG. 2 is a rear perspective view of a retractable nozzle assembly.

Referring next to FIG. 2, the nozzle assembly 80 consists of a spacer plate 81 that covers an L-shaped housing 82. The nozzle assembly 80 is mounted to the top of the vend window to studs (not shown). A lid 83 over the bottom of the L-shaped housing 82 forms an ozone chamber 84, wherein ozone inlet 85 sends ozone into the chamber 84 to sanitize the nozzle 100. Only a small amount of ozone leaks into the vend system, thereby minimizing the deterioration effects of ozone on machine parts.

A sled 86 rides up and down the back 91 of the housing 82. The sled 86 is supported by the piston arm 87 of the air piston 880 which is actuated by pressure into the air inlet 89.

The sled 86 supports the water inlet 89, the check valve 88, and the nozzle clamp 92.

Figure 3A:
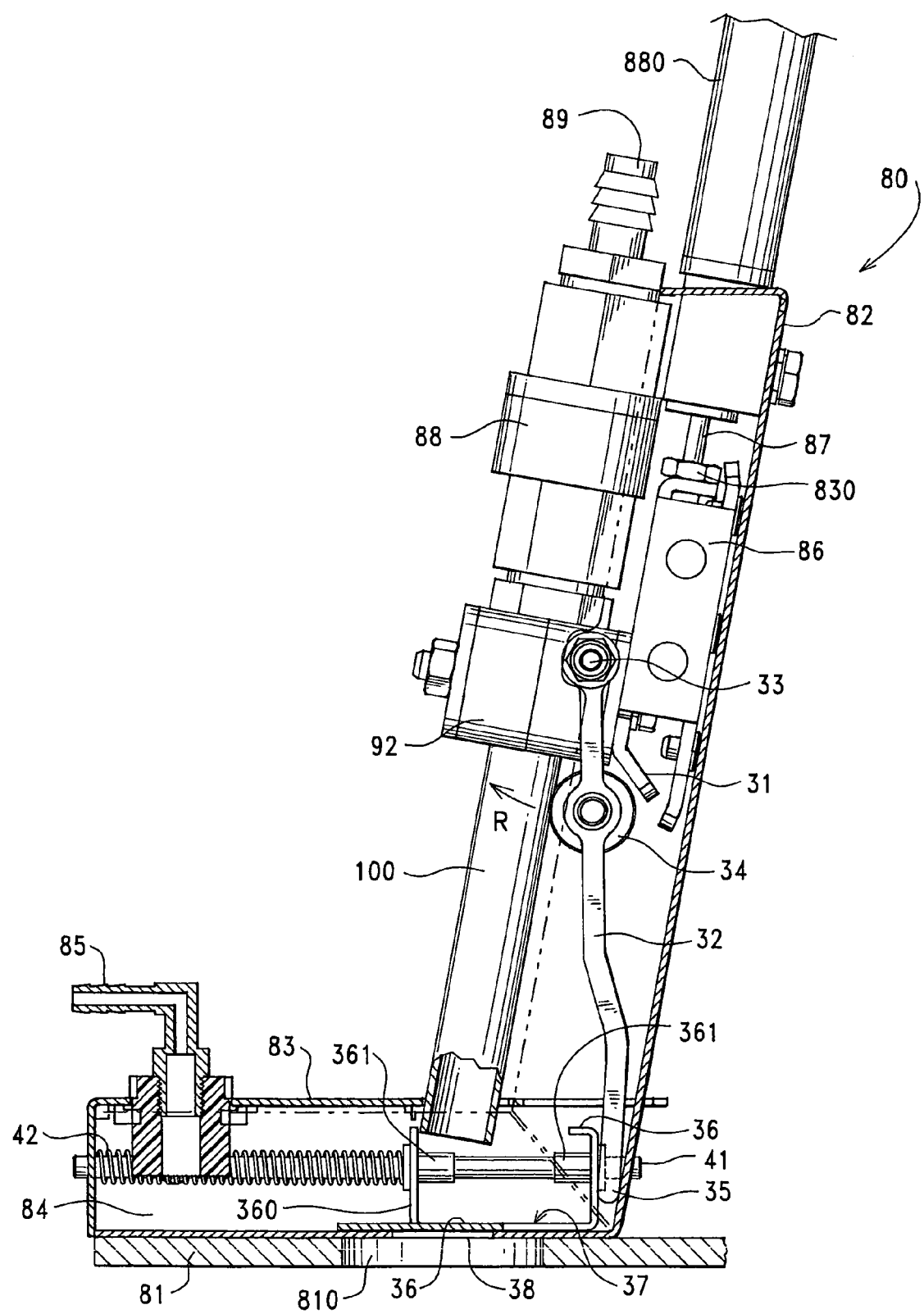
FIG. 3a is a partial cutaway side view of the FIG. 2 nozzle assembly.
Figure 3B:
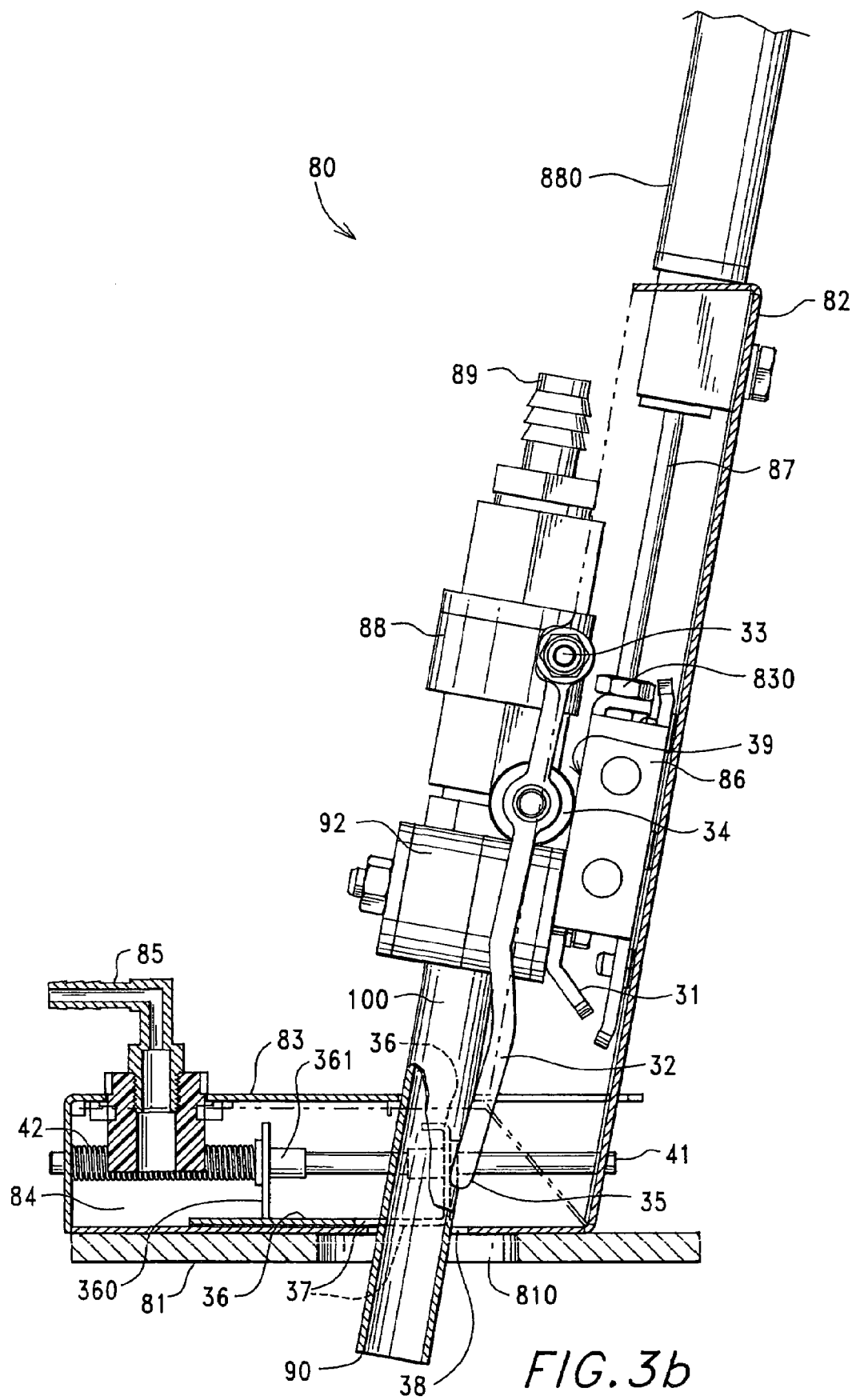
FIG. 3b is the same view as FIG. 3a with the nozzle extended for delivering water.

Referring next to FIGS. 3a, 3b, the nozzle 100 is shown in the retracted position in FIG. 3a, and the vend position in FIG. 3b. The base 81 has a hole 810. The housing 82 has a hole 38. A shutter 36 has a U-shaped hole 37. In operation to open the shutter 36, the piston 880 is actuated to force piston arm 87 down, as shown in FIG. 3b. A ramp 31 at each side of the sled 86 pushes a respective wheel 34 in direction (rear) R, thereby pivoting the trigger arm 32 around pivot point 33, which is supported by the housing 82, in direction R. The action end 35 of the trigger arm 32 slides the shutter 36 in direction R, thereby aligning hole 37 with holes 38, 810. The wheel 34 rides on the sled 86 top surface 39 during the nozzle extension process. The opening of shutter 36 is coordinated to allow nozzle 100 to pass therethrough. During the nozzle extension process, the shutter flange 360, which is connected to the bushing 361, compresses the shutter return spring 42 along support rod 41 as shown in FIG. 3b. Bushings 361 ride along rod 41. Upon cessation of the air pressure into the piston 880, via closing the solenoid valve actuator (FIG. 5, 501), the shutter return spring 42 snaps the shutter closed as the piston return spring (FIG. 5, 51) forces the piston arm 87 back up to its resting position shown in FIG. 5. The controller 60 via sensor 70 (preferably a reed switch) opens the vend valve (FIG. 1, 50) when the nozzle 100 is in the extended (vend) position shown in FIG. 3b.

In summary, a single actuator 880 provides the following process steps:
extending a piston arm to open a shutter door;
wherein the extending of the piston arm concurrently via a linkage extends a nozzle through the open shutter.

Figures 4, 5:
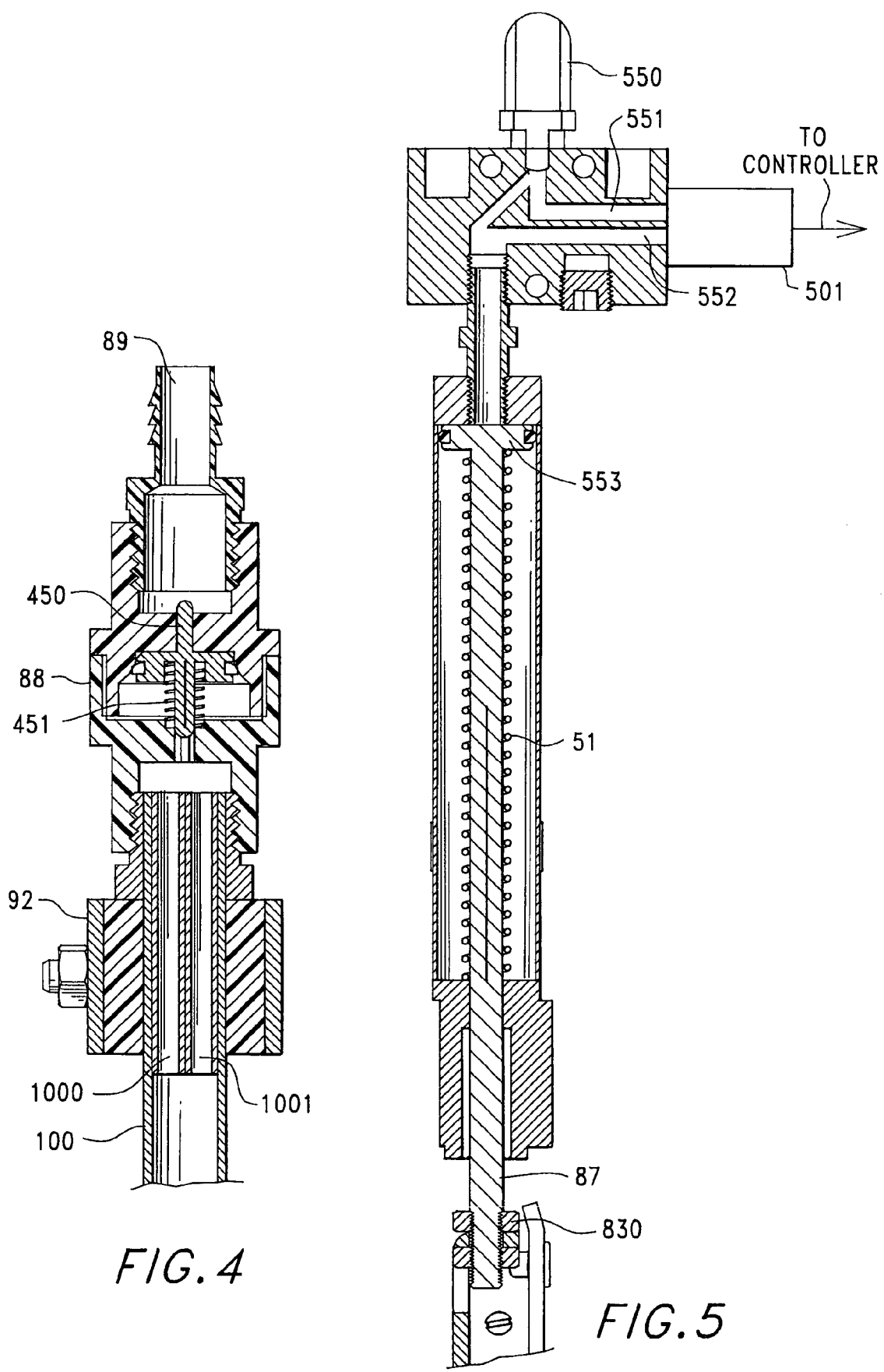
FIG. 4 is a longitudinal sectional view of the nozzle assembly.
FIG. 5 is a longitudinal sectional view of the retraction assembly.

Referring next to FIG. 4, the check valve 88 is of standard design. Water pressure from inlet 89 forces the gate 450 down to allow water to pass to outlet tubes 1000, 1001, and then into nozzle 100. Dual tubes 1000, 1001 help create laminar flow. The spring 451 returns the gate 450 to the closed position shown.

Referring next to FIG. 5, the spring 51 keeps the piston 87 in the retracted (rest) position shown. When the controller (FIG. 1, 60) activates the solenoid actuator 501, the pressurized air from inlet 550 through channel 551 is allowed to pass to outlet channel 552 and against piston head 553. The air pressure overpowers the spring 51, thereby moving the piston arm 87 to the extended position shown in FIG. 3b.

Figure 6:
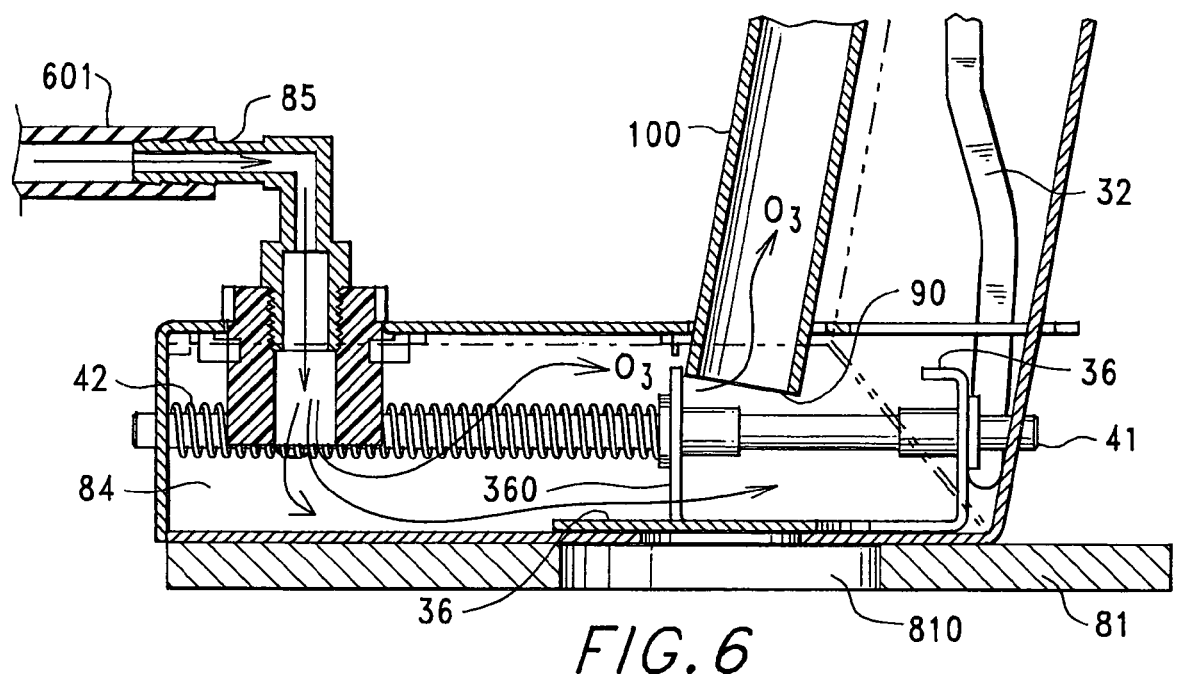
FIG. 6 is a sectional view of the ozone chamber.

Referring next to FIG. 6, a tube 601 feeds ozone into inlet 85 and then into ozone chamber 84. The ozone sanitizes the point of exit 90, as well as the inside of nozzle 100 as shown by arrow labeled 3.

Referring next to FIGS. 7, 8, the nozzle 100 is shown in dots. FIG. 7 shows the position of the above-noted parts in the shutter closed, nozzle retracted position. FIG. 8 shows the position of the parts in the shutter open, nozzle extended position. Nut 830 secures the piston arm 87 to the sled 86.

Figure 9:
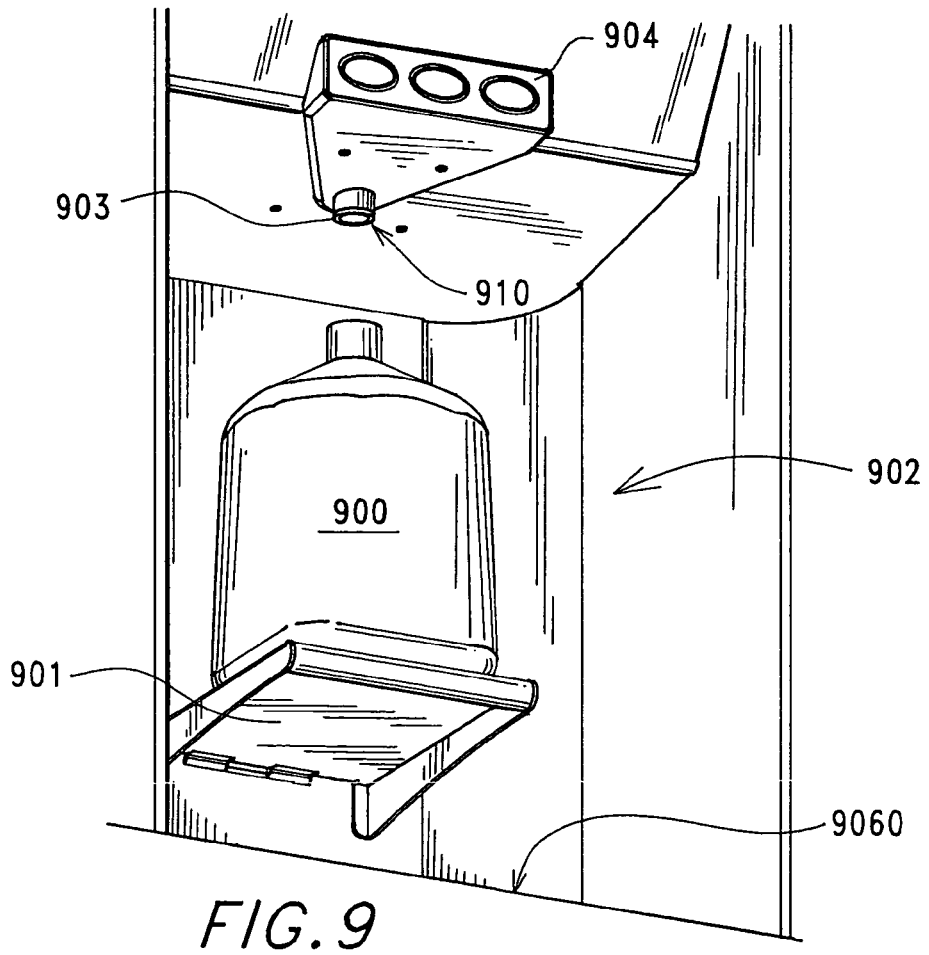
FIG. 9 is a front perspective view of the vend station.

Referring next to FIG. 9, a vend station 902 includes a drop down bottle shelf 901 used for holding a bottle 900, a one gallon container. Larger three and five gallon bottles rest on the sink tray 9060. A customer interface is indicated at 904. A vend spout 903 is preferably a clear ozone resistant protector for the nozzle 100 when the nozzle 100 is extended therethrough down to its lower rim 910.

Figure 11:
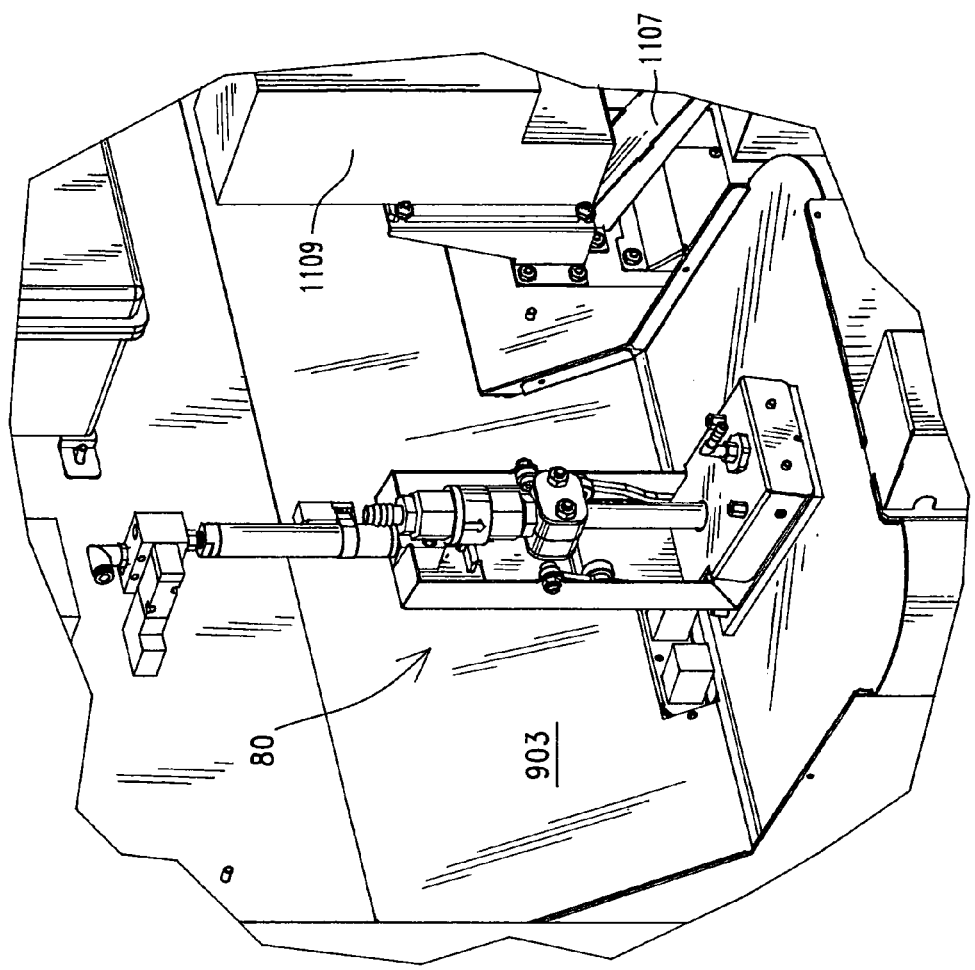
FIG. 11 is a rear cutaway view of the vend housing module showing one retractable nozzle assembly in place.
Figure 10:
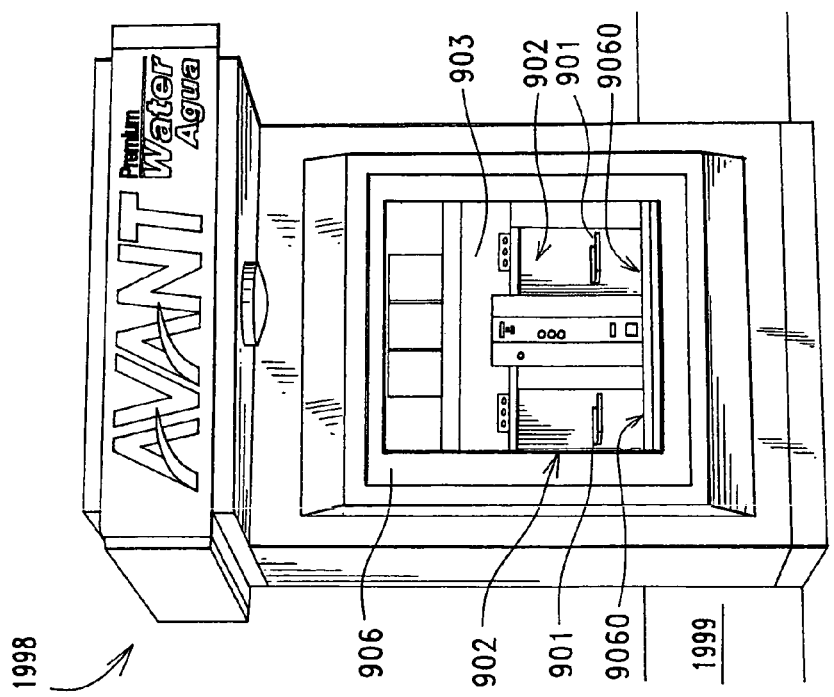
FIG. 10 is a front perspective view of a vend housing module placed against a wall.

Referring next to FIGS. 10, 11, a vend housing module 1998 can be placed against the wall 1999, thereby efficiently using retail floor space. The front of the vend housing module 1998 has an access door 906 (see FIG. 12 for details). The access door 906 supports two vend stations 902. A panel 9030 supports two nozzle assemblies 80, as well as a bill acceptor 1109 and coin chute 1107, and other components.

Figure 12:
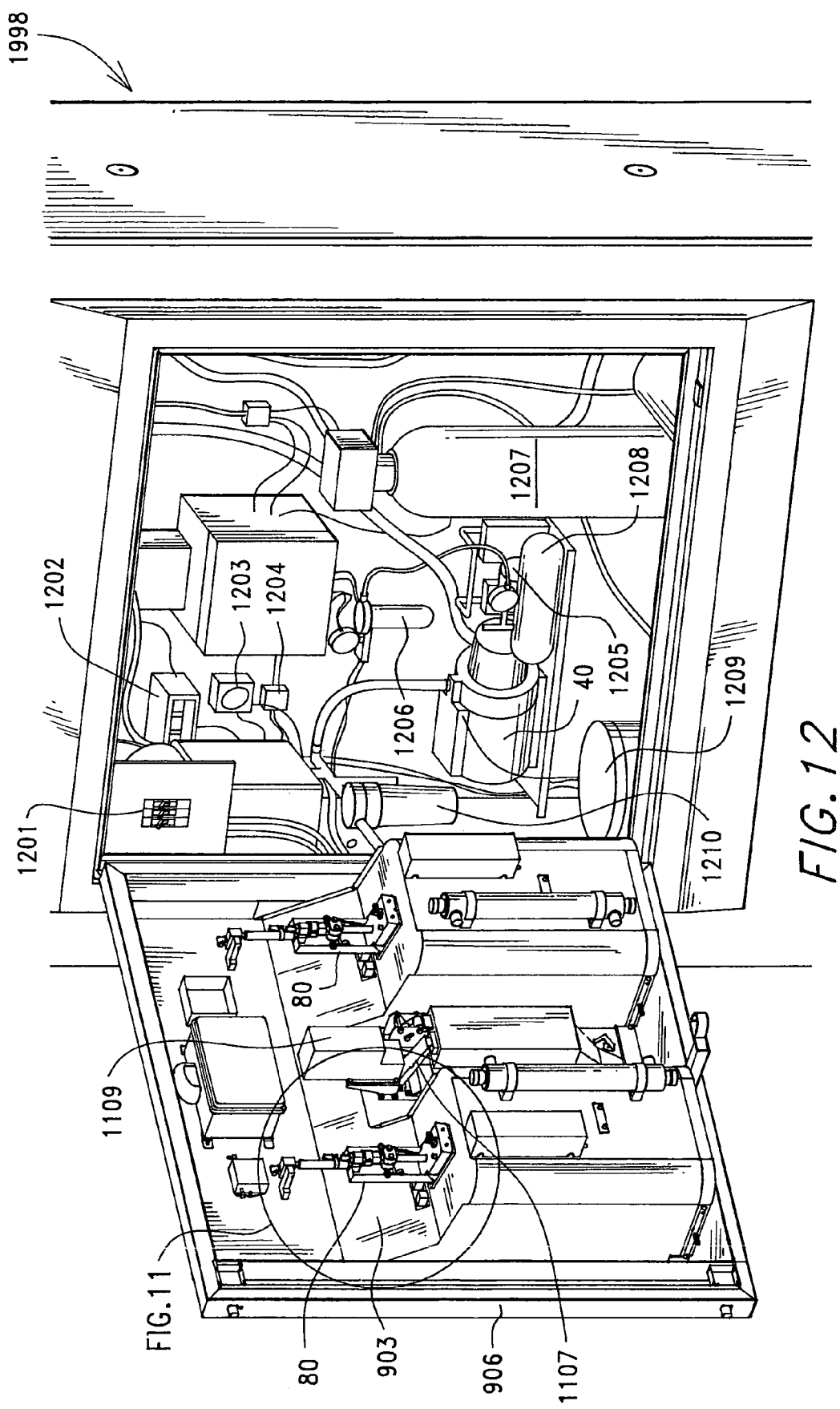
FIG. 12 is a front close up view of the vend housing with the maintenance door opened.

Referring next to FIG. 12, opened door 906 provides maintenance access without moving the module 1998 from the wall. Exposed system components include a circuit breaker panel 1201, a 12 VDC power source 1202, a timer 1203, an ozone generator 1204, an air compressor 1205, an air filter/moisture separator and regulator valve 1206, a water softener 1207, an air tank 1208, a water pump 40 (see FIG. 1), a brine tank 1209, and a 5 micron (polishing) filter 1210.

Figure 13:
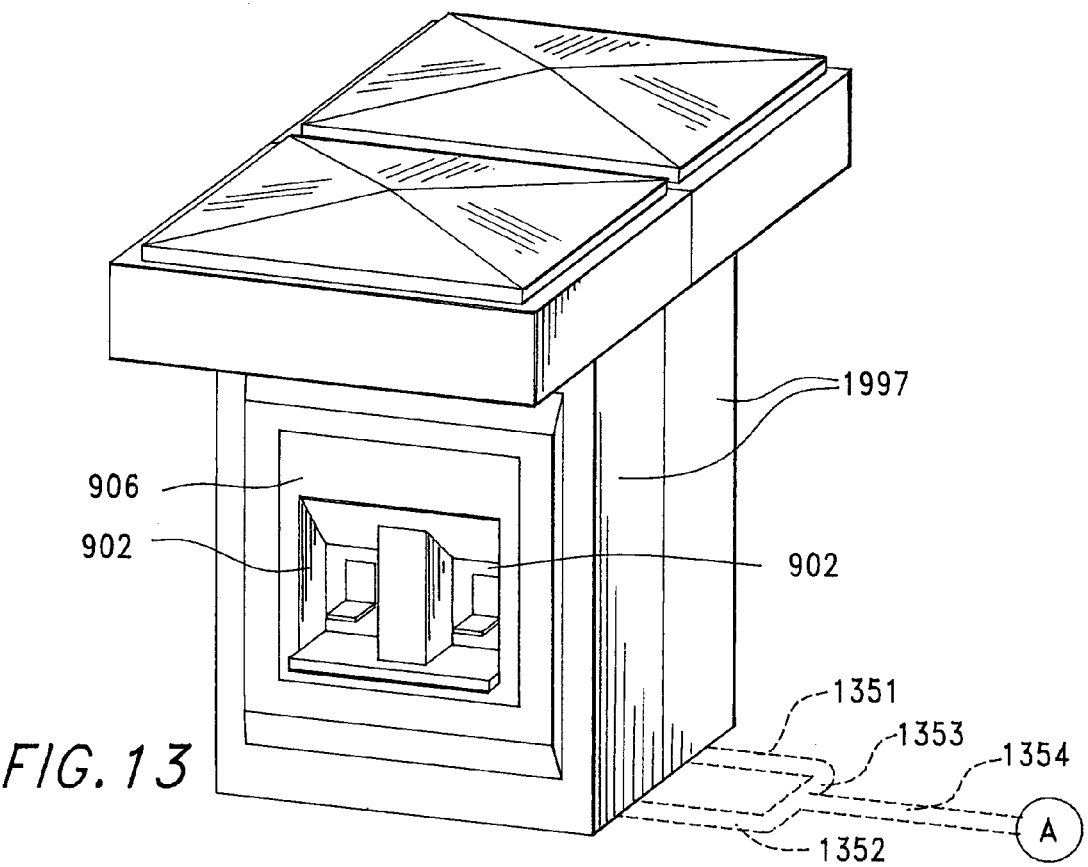
FIG. 13 is a front perspective view of a pair of vend housing modules placed back to back.
Figure 14:
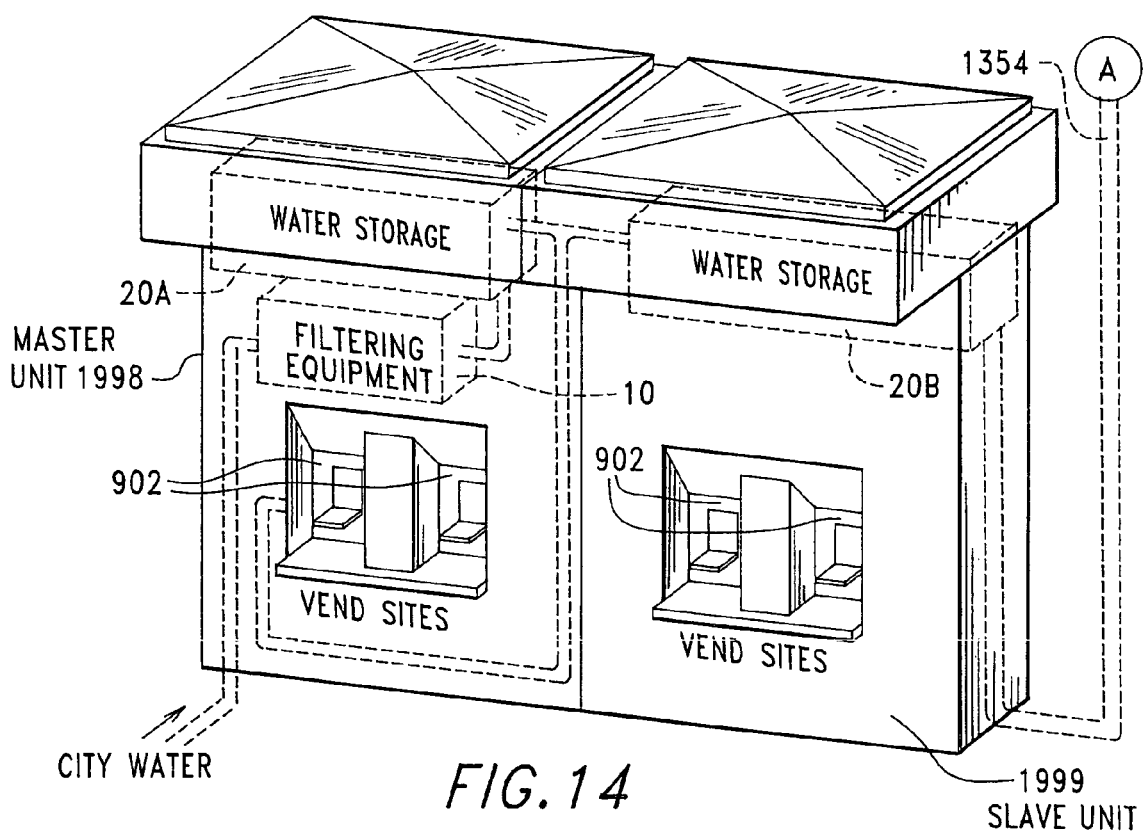
FIG. 14 is a front perspective view of a pair of vend housing modules placed side to side.

Referring next to FIGS. 13, 14, a distributed water filter, storage and vend system is shown comprising a master unit 1998, a slave unit 1999 and a pair of remote units 1997. All of the units have a pair of vend stations 902. All of the units are serviceable from a front door so as to allow the back of the unit to be flush-mounted against a wall or another unit.

The master unit 1998 receives city water and filters it in module 10. Some of the filtered water is stored in tank 20A for use in vending out of the master unit 1998. Some of the filtered water is piped to the slave unit 1999 which has a storage tank 20B therein. The slave unit 1999 can serve several remote units 1997 via pipes 1354. Each slave unit must have a polishing filter and a UV sterilizer in it, but not necessarily anything else. The overall system could have any combination of master, slave and remote units physically arranged in limitless patterns. A simple manifold 1353 ports the water from pipe 1354 to a plurality of remote units via pipes 1351, 1352. A daisy chain piping concept is used to equally share among all slave units the filtered water generated by the master unit.

Figure 15:
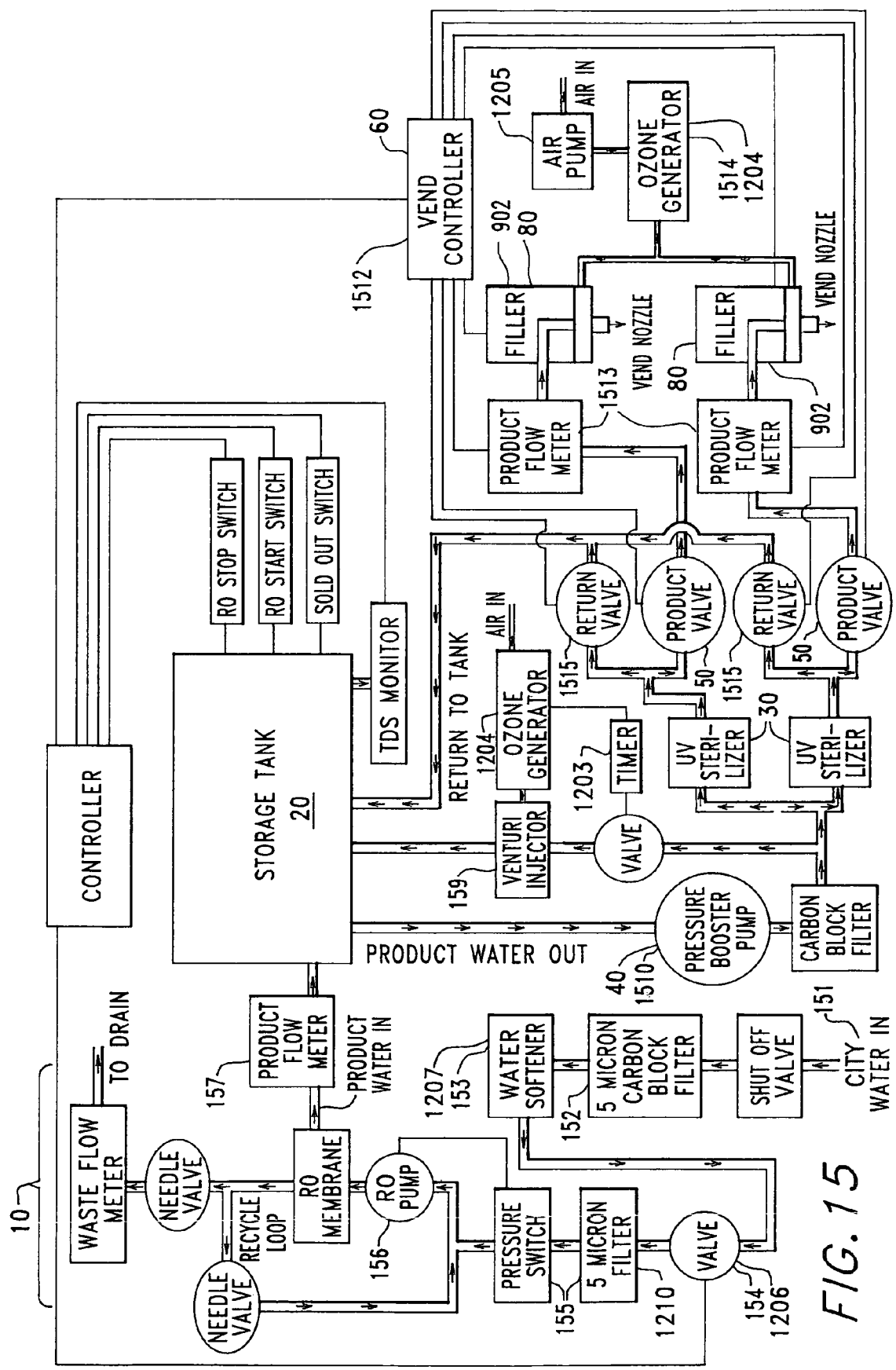
FIG. 15 is a detailed schematic layout of the entire vend system.

Referring next to FIG. 15, the following steps describe the system 1:

151. Incoming water must be from an approved municipal water supply (NAMA).

152. First stage and second stage. Water passes through a 5 micron extruded carbon block filter to remove large sediment and remove chlorine and other volatile organic compounds. Another method is to utilize a 5 micron depth filter to remove sediment and a granulated carbon filter bed type tank to accomplish the same thing.

153. Third stage is an ion exchange water softener to remove calcium and other hardness minerals. This stage can be omitted if the incoming water is not too hard, or if upstream softening has taken place.

154. Fourth stage. Water is then routed through a solenoid actuated valve which opens when the RO unit starts.

155. Fifth stage. Water then passes through a 5 micron depth filter to remove any softening media that may have passed through the softener(optional). From that point, a pressure sensing switch verifies adequate pressure at the inlet of the RO pump and starts the pump.

156. Water is then pumped to 150 to 200 psi by the RO booster pump and routed to the RO membrane(s).

157. Pure water is routed from the membrane(s) through the product flowmeter to the product storage tank.

158. Reject water is routed through the concentrate flowmeter to the waste tank.

159. Ozone is injected into the product storage tank to insure bacteriological safety. It is controlled by a 24 hour cycle timer set to ozonate at a selected time of the day for a selected period of time. (For example, two hours of ozonation time set to run at 2 AM.)

1510. Pure water from the storage tank is routed through a pressure booster pump, through a carbon block filter to remove any off taste from the tank, etc.

1511. Pure water is then routed through ultra violet sterilizers prior to the vend stage.

1512. Pure water is then ready to sell. When a customer initiates a vend by inserting money and making a selection, the controller opens an air valve that lowers the nozzle in place. When the nozzle is in place, a Reid sensor on the filler cylinder sends a signal back to the controller and the controller opens the vend valve.

1513. Water begins to flow to the vend nozzle through a Hall effect rotary flowmeter that sends information back to the controller that controls the amount of water placed in the customer's container. When a predetermined amount of water has flowed through the flowmeter, the control board shuts off the flow of water through the vend valve, and releases the air in the filler, and the nozzle retracts into its "at rest" position.

1514. When the nozzle is in its "at rest" position, it is in an ozone rich atmosphere that effectively sanitizes the vend nozzle. The ozone is produced outside of this small chamber and is pumped in through Teflon tubing.

1515. Water in the ultra violet sterilizers will become warm from the heat emitted from the UV lights, and produce an undesirable product. Electric valves similar to the vend valves are installed after the UVs and are connected to the control board. At predetermined intervals, these valves are opened by the control board and the water in the UVs is flushed back to the storage tank. This keeps the product water fresh and cool.

FIG. 15 shows both the above process steps by number, as well as the apparatus numbers from FIGS. 1, 12.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A retractable nozzle assembly comprising:
   a single actuator mounted in association with a nozzle assembly;
   said nozzle assembly comprising an extension assembly and a shutter;
   wherein the single actuator coordinates an opening of the shutter and an extension of a nozzle through the open shutter; and
   wherein the nozzle assembly further comprises a housing having a moveable sled therein, wherein the nozzle is mounted to the sled, and wherein an actuator arm from the single actuator moves the sled toward the shutter to provide the extension of the nozzle through the open shutter.

2. The retractable nozzle assembly of claim 1, wherein the sled during its movement toward the shutter moves a trigger arm which in turn opens the shutter.

3. The retractable nozzle assembly of claim 2, wherein the housing further comprises a shutter support rod having a spring to close the shutter when the trigger arm is in a rest position.

4. The retractable nozzle assembly of claim 2, wherein the trigger arm has a pivot mount associated with the housing, and the trigger arm has a wheel which the sled engages, thereby pivoting the trigger arm to engage and open the shutter.

5. The retractable nozzle assembly of claim 1 further comprising an ozone chamber surrounding a segment of the nozzle including an exit point of the nozzle.

6. The retractable nozzle assembly of claim 1 further comprising an ozone chamber at a base of the housing, surrounding a segment of the nozzle including an exit point of the nozzle.

7. The retractable nozzle assembly of claim 6, wherein the sled further comprises a nozzle base and a valve.

8. The retractable nozzle assembly of claim 7 further comprising a sensor to detect when the nozzle is extended.

9. The retractable nozzle assembly of claim 8 further comprising a nozzle supply valve, wherein the sensor only opens the nozzle supply valve when the nozzle is extended.

10. A retractable nozzle assembly comprising:
    a single actuator mounted in association with a nozzle assembly;
    said nozzle assembly comprising an extension assembly and a shutter;
    wherein the single actuator coordinates an opening of the shutter and an extension of a nozzle through the open shutter; and
    wherein the single actuator further comprises an air actuator with a piston arm, and the extension assembly farther comprises the piston arm moving a linkage which opens the shutter and concurrently extends the nozzle through the open shutter.

11. A nozzle assembly comprising:
a single actuator means functioning to extend an actuator arm on command;
a retractable nozzle riding on a bracket which is moved by the actuator arm toward a shutter means; and
said shutter means functioning to keep a shutter closed until the actuator arm via a linkage opens the shutter while concurrently extending the nozzle through the open shutter.

12. A nozzle assembly comprising:
a housing having a slideable bracket therein;
an actuator having a piston arm which slides the slideable bracket on command toward a shutter;
said slideable bracket supporting a retractable nozzle;
wherein said housing further comprises a shutter opening linkage, so that sliding the bracket toward the shutter concurrently opens the shutter and extends the nozzle through the open shutter.

13. The nozzle assembly of claim 12, wherein the shutter opening linkage further comprises a trigger arm pivotally mounted to the housing, said trigger arm having a wheel so that when the bracket engages the wheel it pivots the trigger arm into engagement with the shutter to slide the shutter open.

14. The nozzle assembly of claim 12 further comprising an ozone chamber at the base of the housing to sanitize an exit point of the nozzle.

15. The nozzle of claim 14, wherein the housing further comprises a spring return assembly to close the shutter.

16. The nozzle of claim 15 further comprising a sensor to detect an extension of the nozzle through the open shutter, thereby opening a nozzle supply valve.

17. The nozzle of claim 16, wherein the bracket supports a check valve to positively stop a water flow when the nozzle supply valve is closed.

18. The nozzle of claim 12, wherein the actuator further comprises an air actuator with a control valve means functioning to allow pressurized air to the actuator on command.

* * * * *